(12) United States Patent
Merlo et al.

(10) Patent No.: US 7,926,861 B2
(45) Date of Patent: Apr. 19, 2011

(54) INTERCHANGEABLE MODULE FOR GLOVE BOX OF DASHBOARD OF MOTOR VEHICLE AND GLOVE BOX FITTED WITH SUCH INTERCHANGEABLE MODULE

(75) Inventors: Alberto Maria Merlo, Orbassano (IT); Angelo Storgato, Orbassano (IT); Giorgio Masoero, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 360 days.

(21) Appl. No.: 12/052,529

(22) Filed: Mar. 20, 2008

(65) Prior Publication Data
US 2008/0231065 A1 Sep. 25, 2008

(30) Foreign Application Priority Data

Mar. 22, 2007 (IT) .............................. TO2007A0211

(51) Int. Cl.
*B60R 7/06* (2006.01)
(52) U.S. Cl. ..................................... 296/37.12; 224/483
(58) Field of Classification Search ................. 296/37.5, 296/24.34, 24.35, 37.12, 24.3; 224/483
See application file for complete search history.

(56) References Cited

U.S. PATENT DOCUMENTS

| | | | | |
|---|---|---|---|---|
| 2,657,967 A * | 11/1953 | Gilchrist | ........................ | 312/246 |
| 4,355,837 A * | 10/1982 | Shimizu et al. | ............ | 296/37.12 |
| 5,197,775 A * | 3/1993 | Reeber | ........................ | 296/37.12 |
| 5,558,385 A * | 9/1996 | Gross et al. | ................ | 296/37.12 |
| 5,915,776 A * | 6/1999 | Bieri | ........................... | 296/37.12 |
| 5,971,461 A * | 10/1999 | Vaishnav et al. | ........... | 296/37.12 |
| 6,050,628 A * | 4/2000 | Allison et al. | .............. | 296/37.12 |
| 6,060,700 A * | 5/2000 | Perlman et al. | ............... | 219/679 |
| 6,231,099 B1 * | 5/2001 | Greenwald | ................... | 296/37.8 |
| 6,715,815 B2 * | 4/2004 | Toppani | ..................... | 296/37.12 |
| 6,830,277 B2 * | 12/2004 | Zierle et al. | ................ | 296/37.12 |
| 7,152,898 B2 * | 12/2006 | Augustyniak | .............. | 296/37.12 |
| 7,494,170 B2 * | 2/2009 | Hanzel et al. | ............. | 296/37.12 |
| 2002/0158448 A1 * | 10/2002 | Okonkwo | ................... | 280/728.2 |
| 2005/0218681 A1 * | 10/2005 | DePue et al. | ............... | 296/37.12 |
| 2006/0131913 A1 * | 6/2006 | Herterich et al. | ............ | 296/37.1 |
| 2006/0145504 A1 * | 7/2006 | Augustyniak | ............... | 296/37.12 |
| 2006/0197353 A1 * | 9/2006 | Hanzel et al. | ............... | 296/37.12 |
| 2008/0148752 A1 * | 6/2008 | Marginean et al. | ............. | 62/244 |
| 2008/0150307 A1 * | 6/2008 | Quigley et al. | ............. | 296/24.34 |
| 2008/0290682 A1 * | 11/2008 | Sauer | ......................... | 296/37.12 |

FOREIGN PATENT DOCUMENTS

| | | | |
|---|---|---|---|
| DE | 197 50 963 A1 | 5/1998 | |
| DE | 198 20 581 A1 | 11/1998 | |
| DE | 199 42 892 A1 | 3/2001 | |
| DE | 10 2004 006 408 A1 | 8/2005 | |
| JP | 55 022536 | 2/1980 | |
| JP | 10 000974 | 1/1998 | |
| WO | WO 9817501 A1 * | 4/1998 | |

* cited by examiner

*Primary Examiner* — Glenn Dayoan
*Assistant Examiner* — Pinel E Romain
(74) *Attorney, Agent, or Firm* — Berenato & White, LLC

(57) ABSTRACT

A module for an object-holding drawer of a dashboard of a motor vehicle can be chosen from a plurality of different modules for accommodating different objects and is provided with a container connected in a fixed position and in an interchangeable manner to a shell by means of an attachment device; the container has an opening closed by a door, which is hinged to the container by means of hinge elements that form part of the attachment device.

19 Claims, 18 Drawing Sheets

INTERCHANGEABLE MODULE FOR GLOVE BOX OF DASHBOARD OF MOTOR VEHICLE AND GLOVE BOX FITTED WITH SUCH INTERCHANGEABLE MODULE

This application claims priority of Italian Patent Application No. TO2007A 000211 filed Mar. 22, 2007, the disclosure of which is incorporated herein by reference.

This invention relates to an interchangeable module for a glove box of a dashboard of a motor vehicle.

BACKGROUND OF THE INVENTION

There is a need for a glove box, or an object-holding drawer, which is versatile and can be set up to suit the various requirements of drivers, which is spacious, has a relatively small number of components and is easy to use.

SUMMARY OF THE INVENTION

The aim of the present invention is to meet the above-mentioned requirements in a simple and economical manner.

According to the present invention a module is made for a glove box, or an object-holding drawer, of a dashboard of a motor-vehicle; it being possible to choose the module from among a plurality of various modules to accommodate different objects, and comprising:

a container defining an access opening;
attachment means to connect the said container in a fixed position and in an interchangeable manner to a shell;
a door to open and close the said access opening;
two hinge elements coaxial with each other along a horizontal axis to hinge the door to the container about the horizontal axis.

BRIEF DESCRIPTION OF THE DRAWINGS

The invention will now be described with reference to the accompanying drawings which illustrate a non-limiting embodiment thereof, in which.

DETAILED DESCRIPTION OF THE INVENTION

Figure 1:
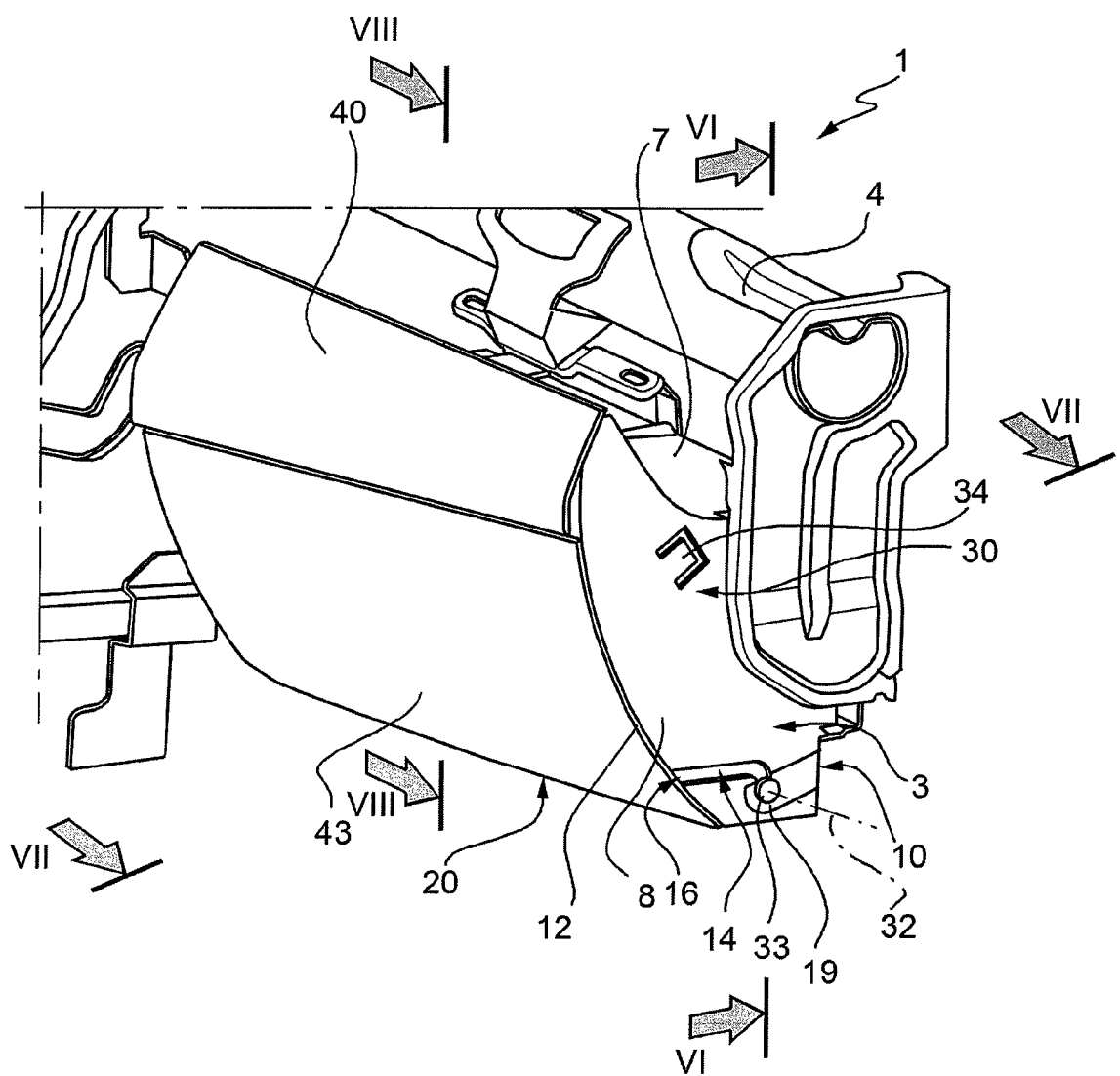
FIG. 1 is a perspective view of an object-holding drawer for a dashboard of a motor vehicle provided with a first preferred embodiment of the interchangeable module according to the present invention.

In FIG. 1, 1 shows a glove box, or an object-holding drawer, forming part of a dashboard of a motor vehicle (not shown) and comprising a shell 3 connected in a fixed position in a manner not illustrated to a cross-member 4 that supports the dashboard.

Figure 2:
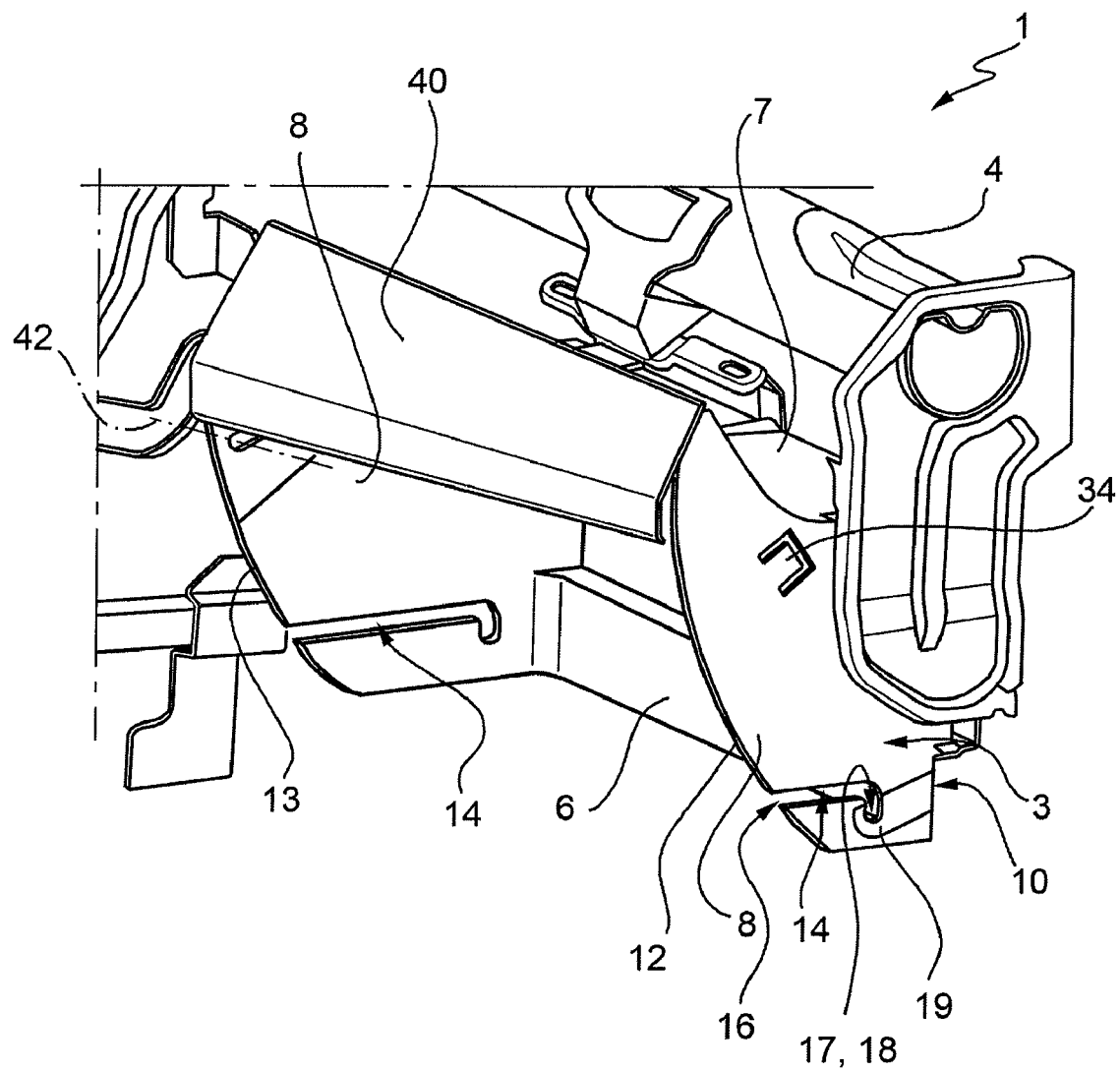
FIG. 2 is similar to FIG. 1 and illustrates the object-holding drawer without the interchangeable module.

With reference to FIG. 2, the shell 3 is made of a plastic material, reinforced preferably with fibreglass, and comprises a back wall 6, an upper wall 7 and two side walls 8. A metal bracket 10 is arranged along the outer surface of the walls 8 and 6 and is fixed to the cross-member 4 both to stiffen the shell 3 and/or the connection of the shell 3 to the cross-member 4, and to support an interchangeable module, as will be better explained below.

The walls 8 comprise respective edges 12 facing the passenger compartment and defining the sides of an opening 13 to access the space inside the shell 3. The walls 8 have two slots 14, which extend from the edges 12 and are parallel to each other and comprise respective initial straight sections 16 that are substantially horizontal and respective blind end sections 17. The sections 17 are facing downwards in relation to the sections 16 and define respective seats, which are aligned with respective retaining and supporting seats 18 made in the ends 19 of the bracket 10.

Figure 6:
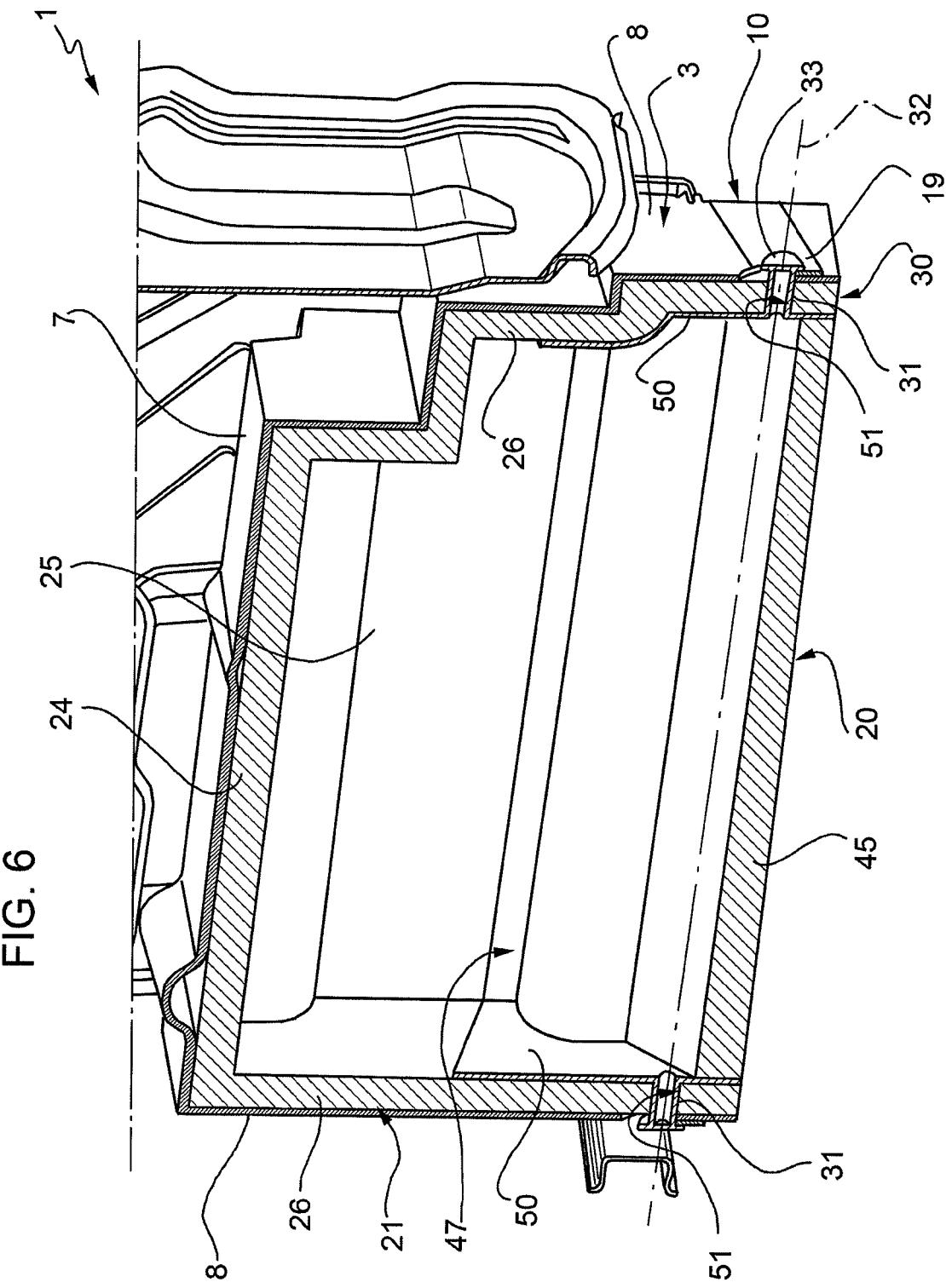
FIG. 6 is a schematic section of the object-holding drawer along a transverse vertical plane indicated by Line VI-VI in FIG. 1 and shows a detail of the connection of the interchangeable module.
Figure 7:
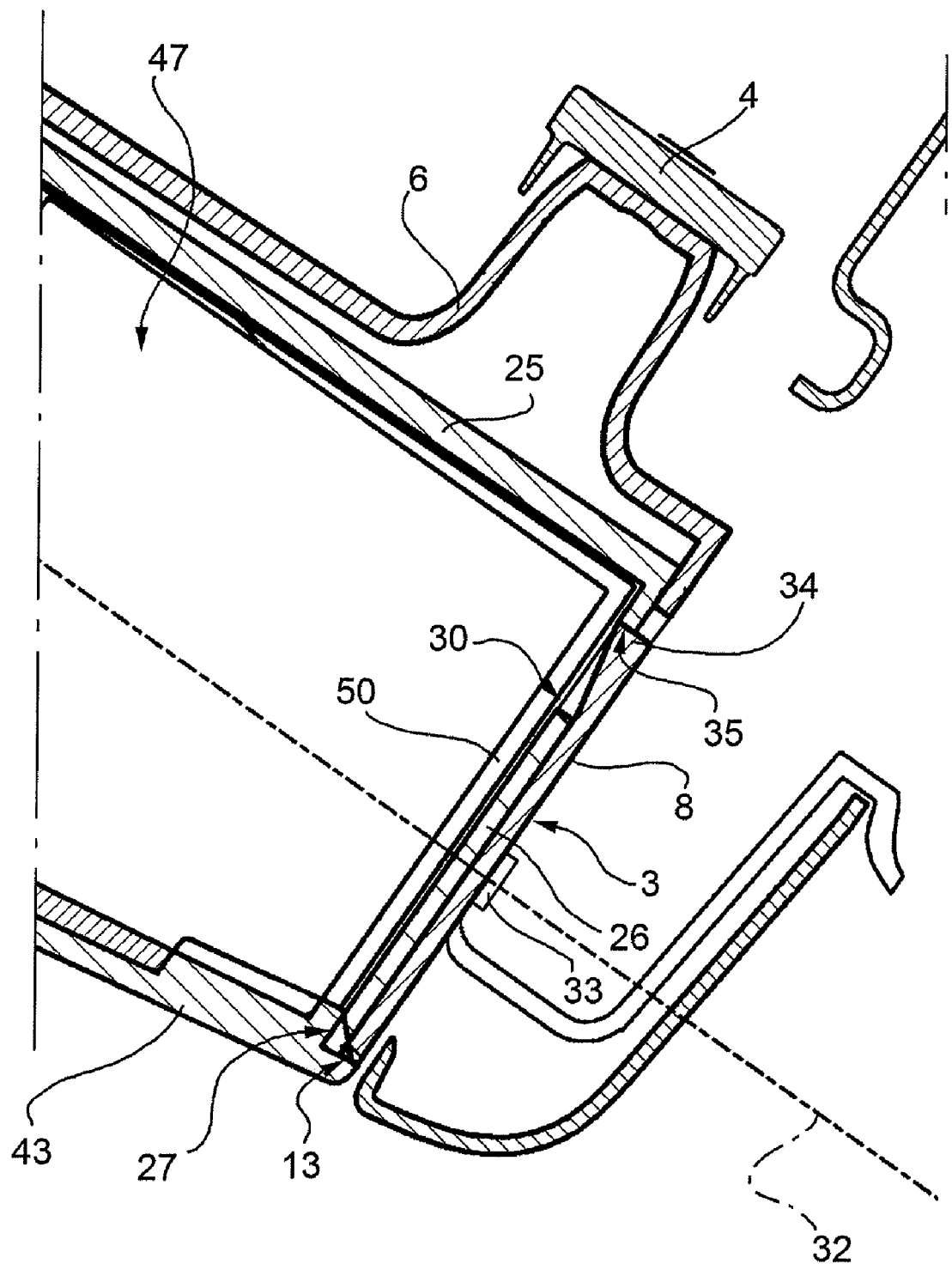
FIG. 7 is a schematic section, on an enlarged scale, of the object-holding drawer along a plane indicated by Line VII-VII in FIG. 1 and shows another detail of the connection of the interchangeable module.
Figure 8:
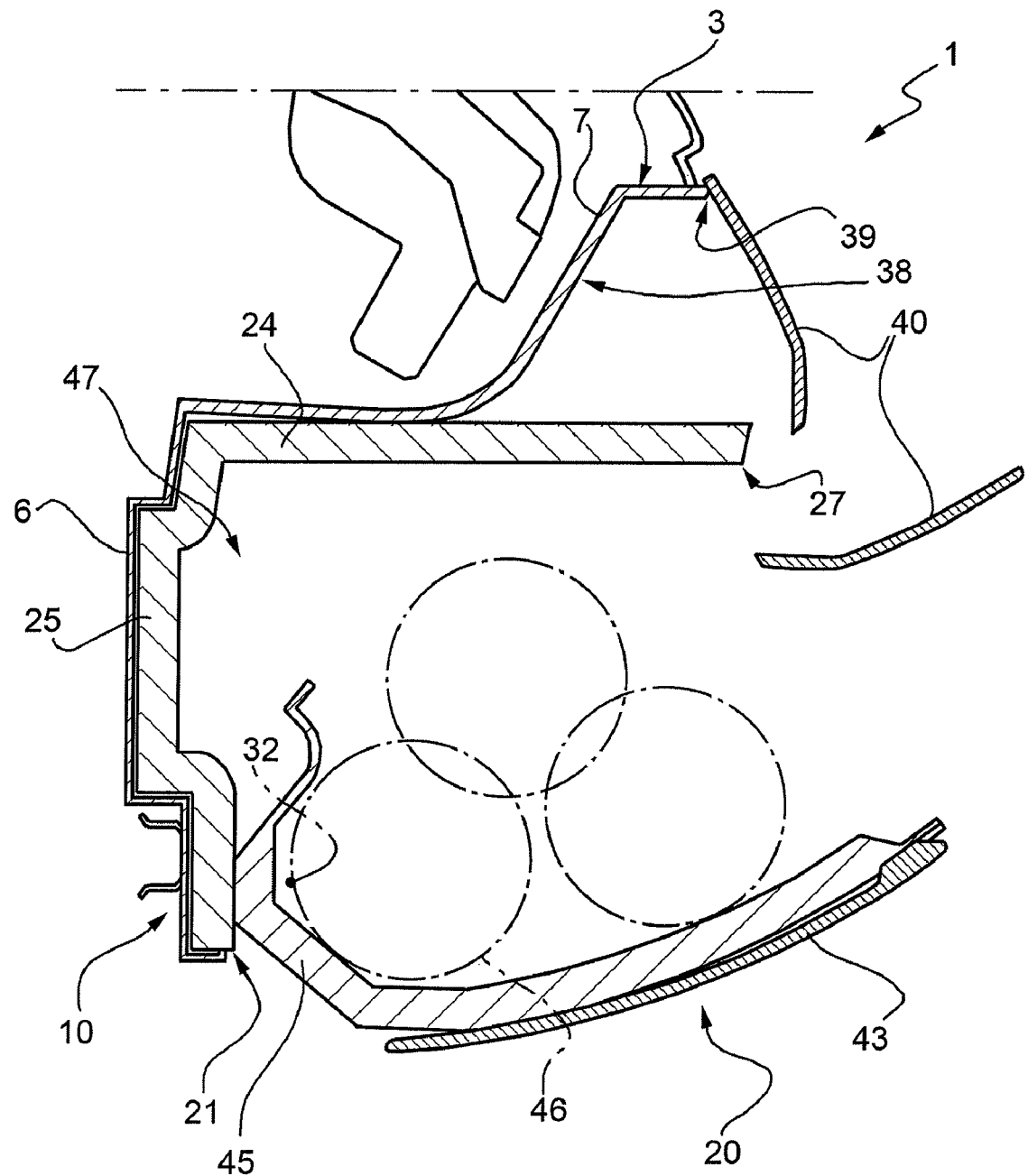
FIG. 8 is a schematic section of the object-holding drawer along a longitudinal vertical plane shown by Line VIII-VIII in FIG. 1.

With reference to FIGS. 6 to 8, the shell 3 houses a module 20, which entirely occupies the space between the walls 8 and comprises a container 21. The container 21 in turn comprises an upper wall 24, a back wall 25, and two side walls 26, which define an inner space and an access opening 27 towards the passenger compartment.

The walls 26 are connected to the walls 8 and to the bracket 10 by means of a connecting device 30, which comprises two pins 31 (FIG. 6), which are coaxial with each other along a horizontal axis 32, overhang outwards in relation to the walls 26, terminate with respective flanges 33 of a larger diameter, engage in the seats 18 due to the effect of the weight of the module 20 and are therefore supported by the ends 19. The device 30 also comprises two resilient teeth 34 made in one piece with the walls 8, and two seats 35 made in the walls 26 and engaged by the teeth 34. In particular, according to FIGS. 3 to 5, the module 20 is fitted by inserting the container 20 into the shell 3 through the opening 13 and, at the same time, the pins 31 in the slots 14, with the flanges 33 arranged beyond the walls 8 and with the opening 27 facing downwards.

The pins 31 are made to slide down to the bottom of the slots 14, that is until they rest against the ends 19 in the seats 18. In this way, the module 20 remains held longitudinally by the seats 18. The module 20 is then rotated upwards about the axis 32 elastically deforming the teeth 34 until the teeth 34 click into their respective seats 35 (FIG. 7).

The module 20 is removed by means of a special tool (not shown), which is used from outside by inserting it between the walls 26 and 8, for example in appropriate grooves (not shown), until the teeth 34 are released from the seats 35.

Figure 3:
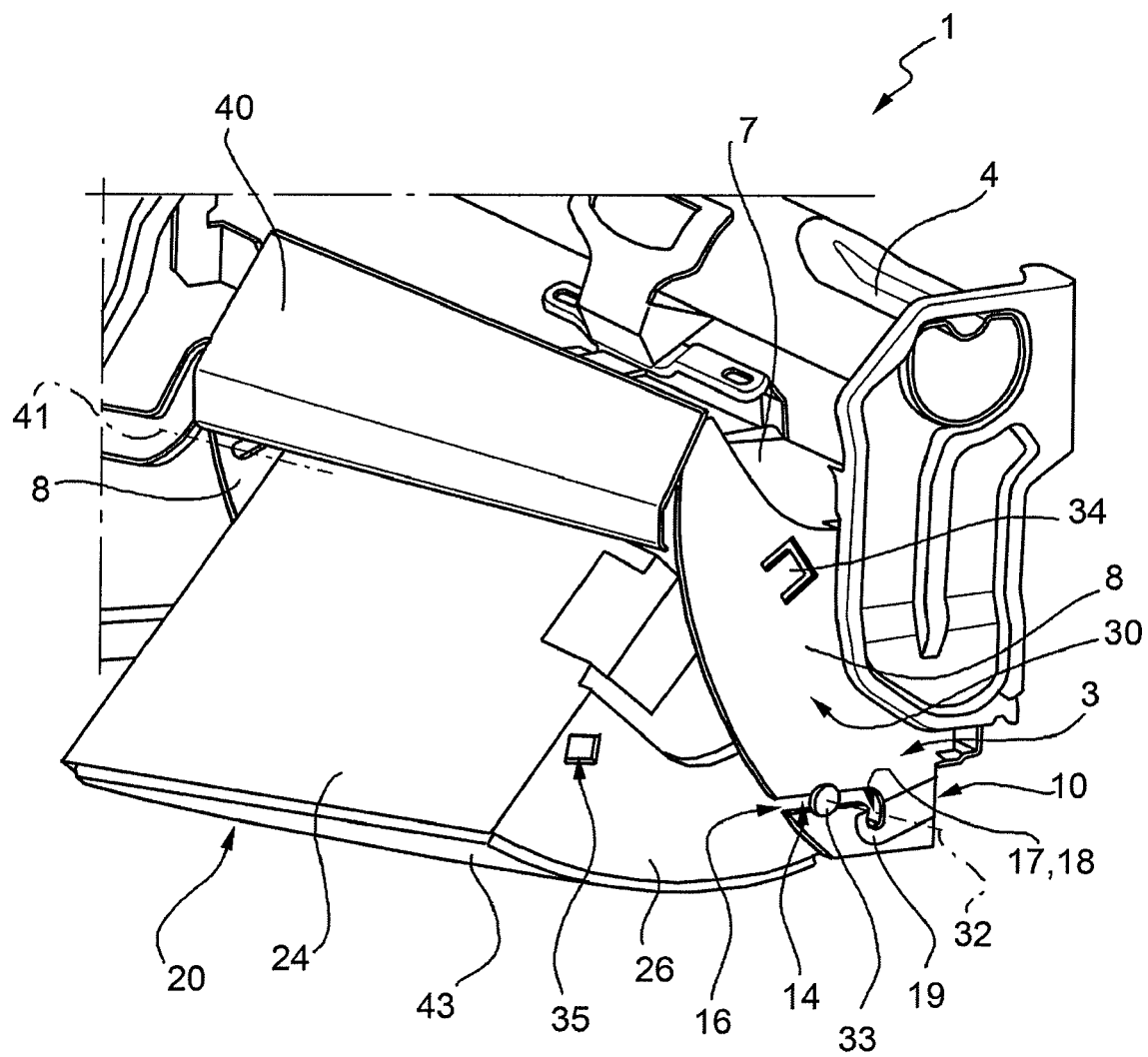
FIGS. 3 to 5 are similar to FIG. 1 and show successive stages of fitting the interchangeable module.
Figure 4:
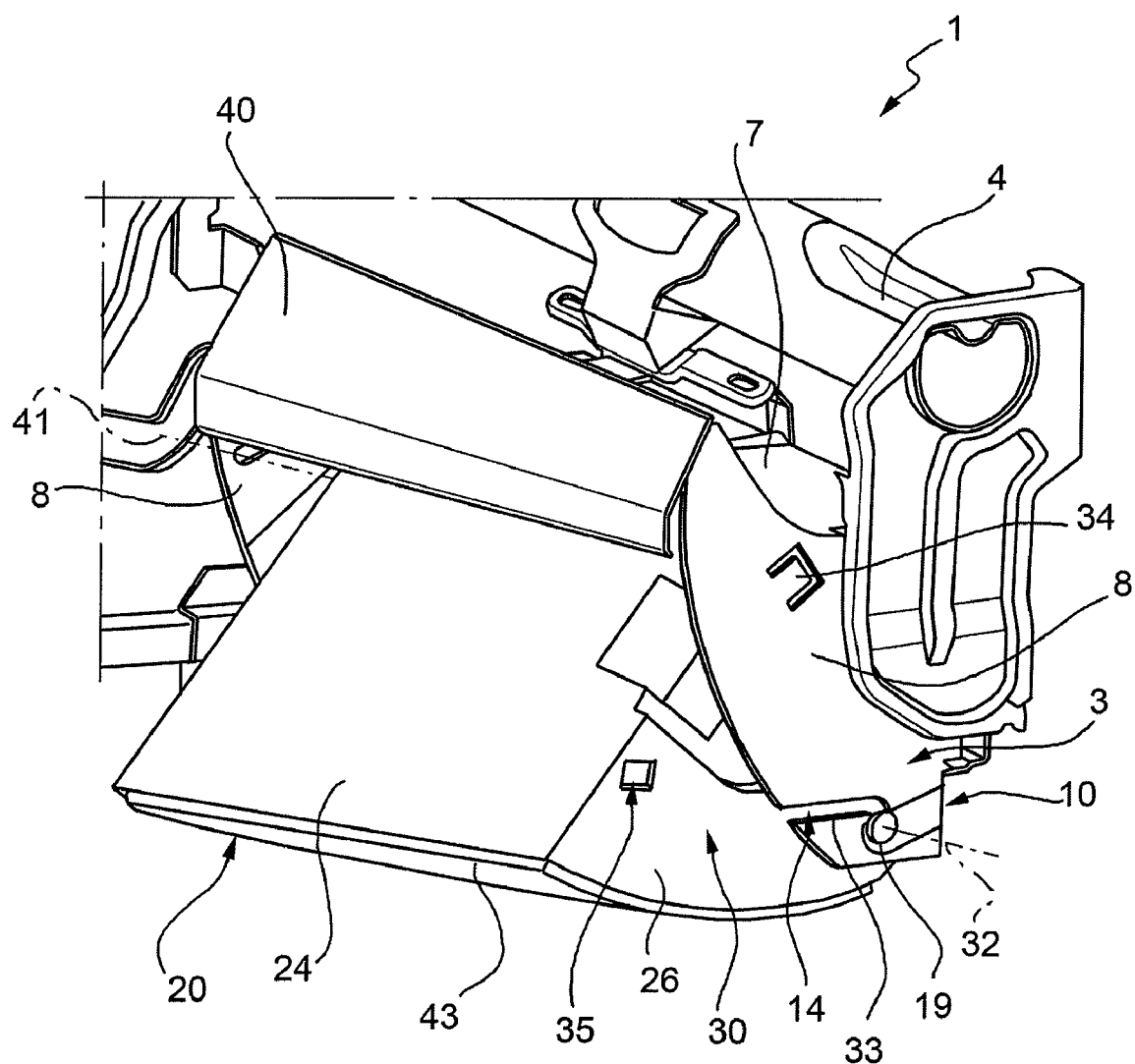
Figure 5:
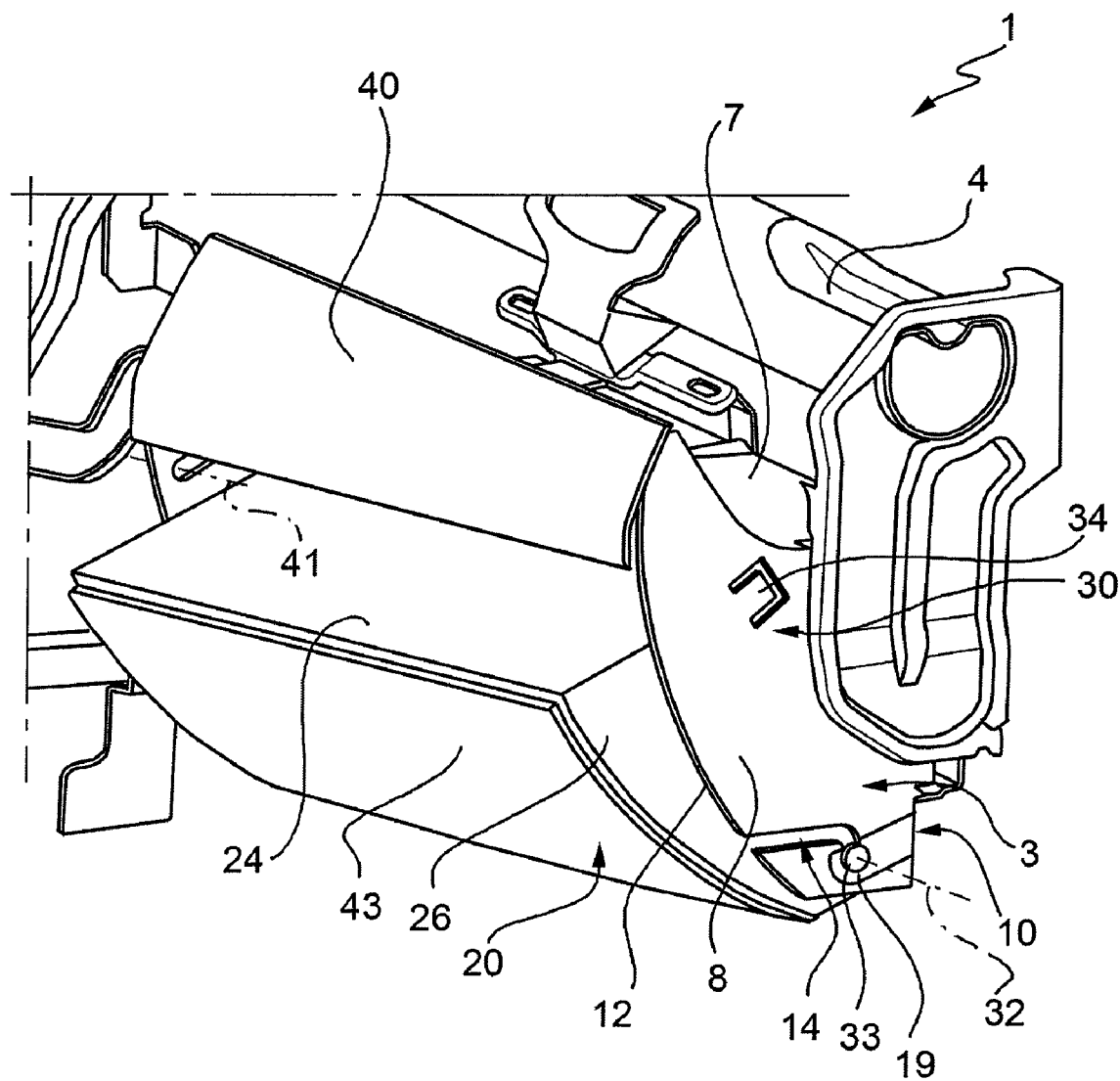

In the final position in which the teeth 34 engage in the seats 35, as shown in FIGS. 6 to 8, the wall 25 is drawn towards the wall 6; the opening 27 coincides with the bottom part of the opening 13; and the wall 24 defines, together with the walls 7 and 8, a compartment 38 accessible through an opening 39. The opening 39 coincides with the top part of the opening 13 and can be opened/closed by a door 40, which is hinged to the walls 8 in order to rotate about a horizontal axis 41 (FIGS. 2-4).

The module 20 also comprises a door 43 which is hinged to the walls 26 by means of the pins 31 to rotate about the axis 32 and open/close the opening 27. Therefore, the door 43 forms part of the module 20. A releasable holding device (not shown) is provided to hold the door 43 in the closed position.

With particular reference to FIG. 8, the module 20 comprises a bottom cradle 45 which is provided to stow objects, such as bottles 46, and is fixed in relation to the door 43 so as to pivot about the axis 32, and covers the entire internal surface of the door 43. The container 21 and the cradle 45 are thermally insulated and define a compartment 47, which can be cooled by means of a flow of air from the motor vehicle's air-conditioning system, or by means of a known refrigeration system (not shown), comprising a condenser, an evaporator, an engine-compressor and a thermostat that automatically regulates the temperature in the compartment 47 by switching the engine-compressor on and off. In particular, the refrigeration system is arranged in the compartment 38 and carried by the wall 24 (in this case, the door 40 could be in the form of a fixed panel).

With reference to FIG. 6, the door 43 has, in a fixed position, two side walls 50 which slide along the walls 26 during the opening/closing of the door 43. The pins 31 extend axially overhanging the walls 50, they are fixed in relation to the walls 50 and engage in a rotating manner respective hinge seats 51 made in the walls 26. Alternatively, the pins 31 are fixed in relation to the walls 26 and engage in a rotating manner respective hinge seats made in the walls 50.

Figure 9:
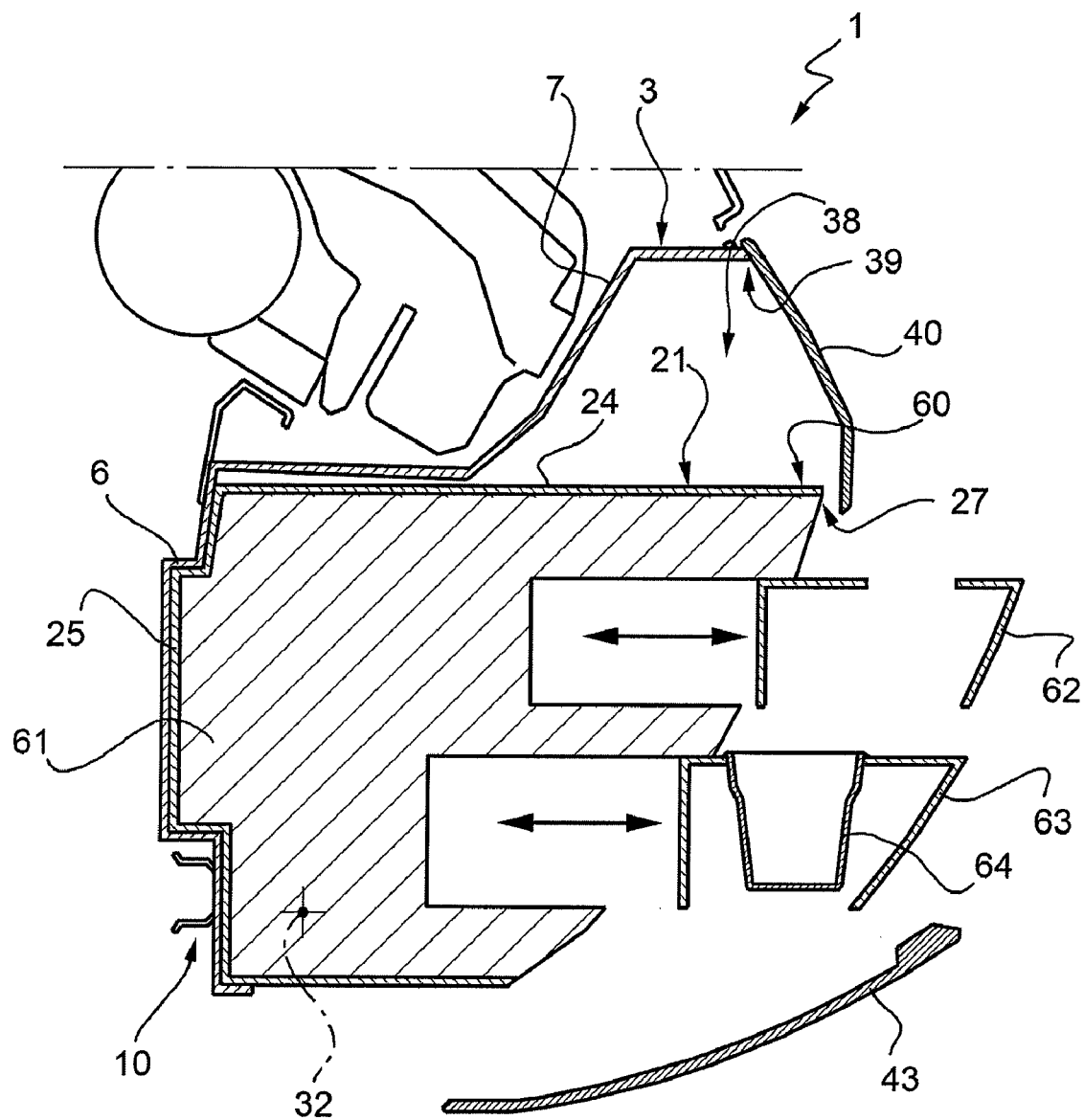
FIG. 9 is similar to FIG. 8 and shows a second preferred embodiment of the interchangeable module according to the present invention.
Figure 10:
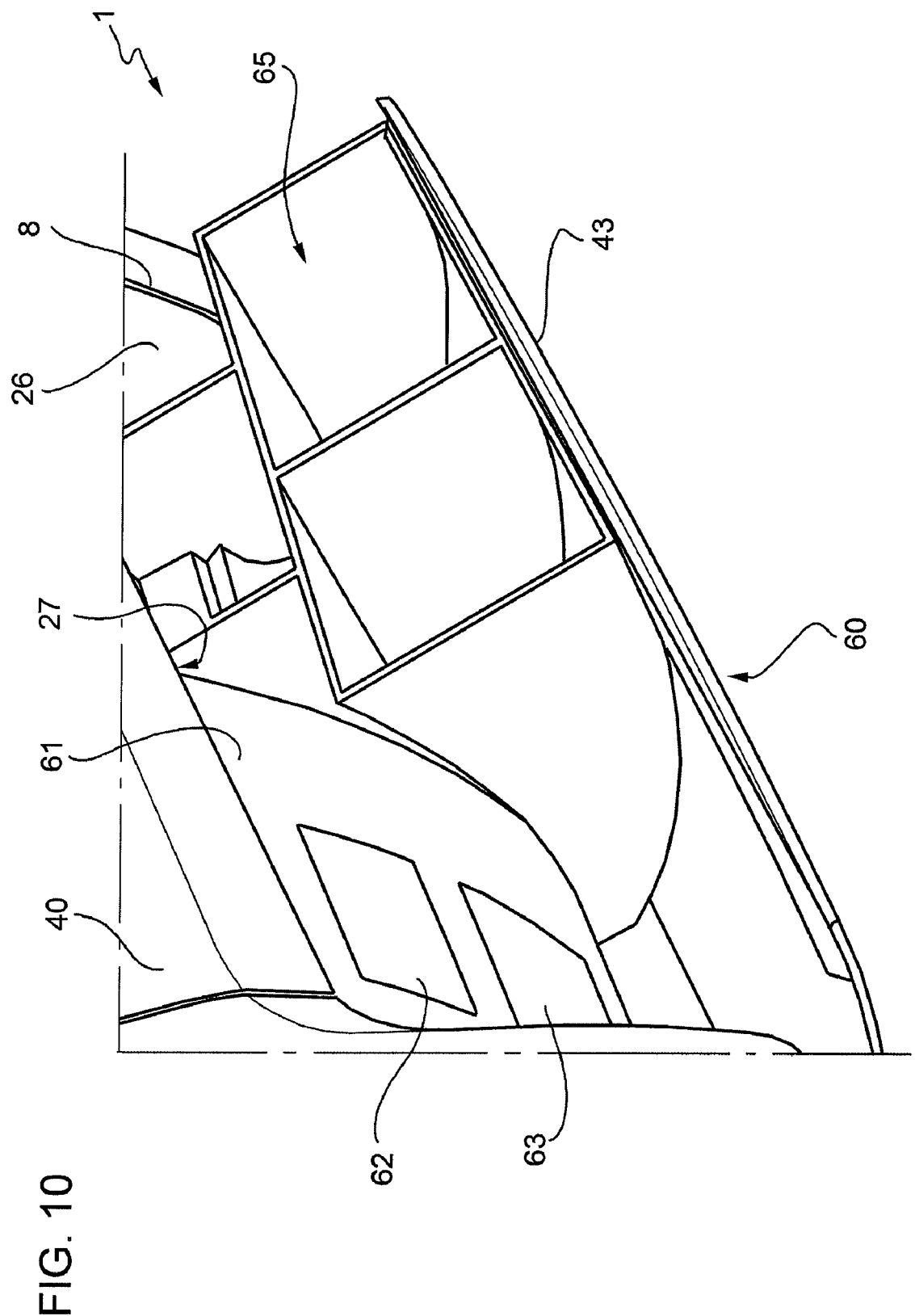
FIG. 10 is a perspective view of the interchangeable module shown in FIG. 9.
Figure 11:
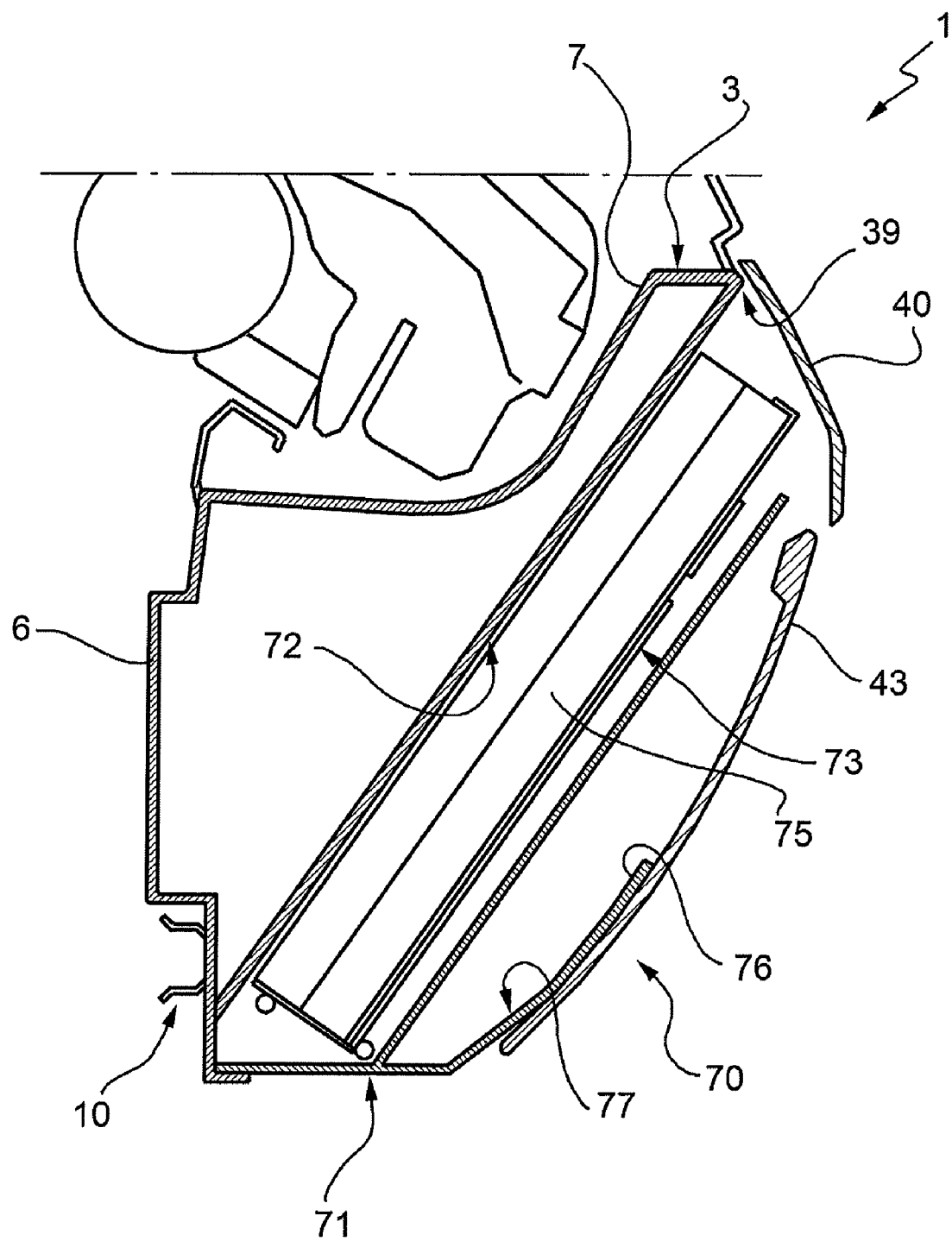
FIG. 11 is similar to FIGS. 8 and 9 and shows a third preferred embodiment of the interchangeable module according to the present invention.

FIGS. 9 and 10 illustrate a module 60, whose constituent parts are indicated, where possible, by the same reference numbers as module 20. The module 60 differs from the module 20 by the fact that the container 21 supports an electric machine 61 for the preparation of coffee (illustrated schematically), whose front surface is arranged in line with the opening 27. The machine 61 is fixed, in a manner not shown, to the container 21, it partially occupies the space between the walls 26 and has two drawers 62,63, which are arranged one above the other and can be extracted longitudinally. The drawer 62 is configured to insert a coffee pod, while the drawer 63 is configured to accommodate a beaker 64 into which the machine 61 causes the prepared coffee to pour. The door 43 has no cradle 45 but carries, in a fixed position, a plurality of object-holding compartments 65 (to hold the pods, beakers, sugar and stirrers or teaspoons) which lie alongside the machine 61 in the compartment 47 when the door 43 is in a closed position.

Figure 12:
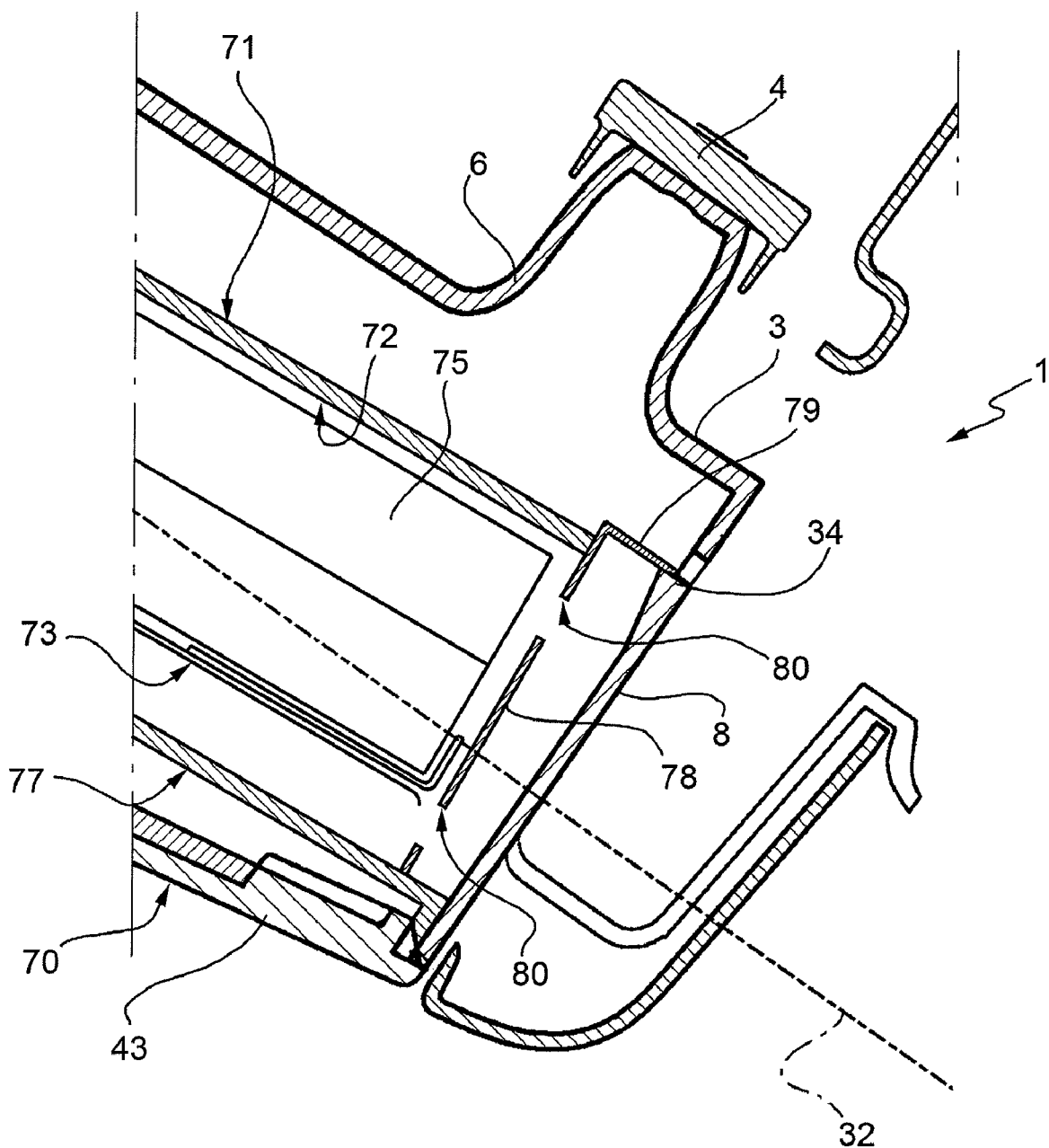
FIG. 12 is similar to FIG. 7 and relates to the connection of the interchangeable module shown in FIG. 11.
Figure 13:
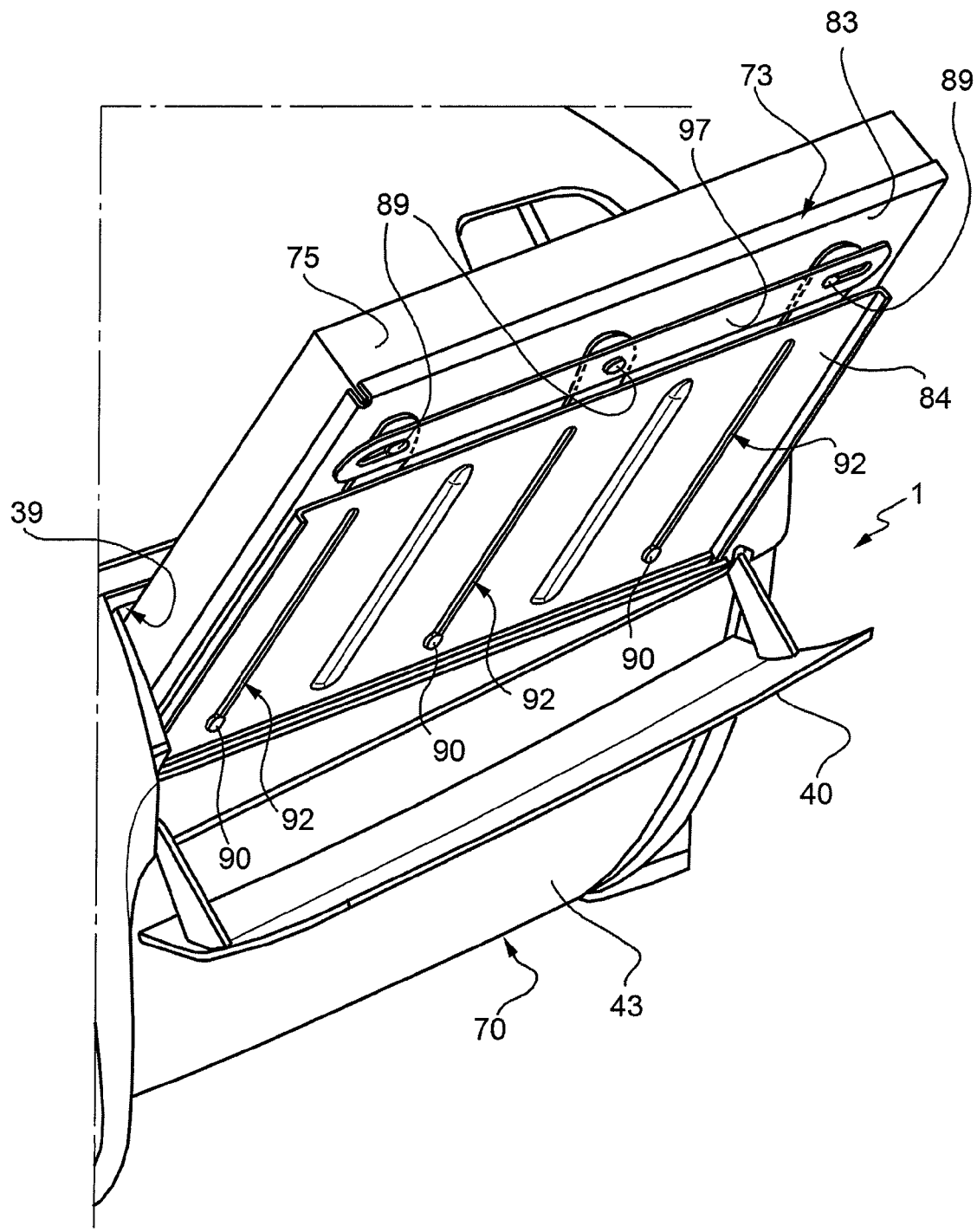
FIG. 13 shows, in perspective, a first stage of the extraction of a laptop computer carried by the interchangeable module shown in FIG. 11.
Figure 14:
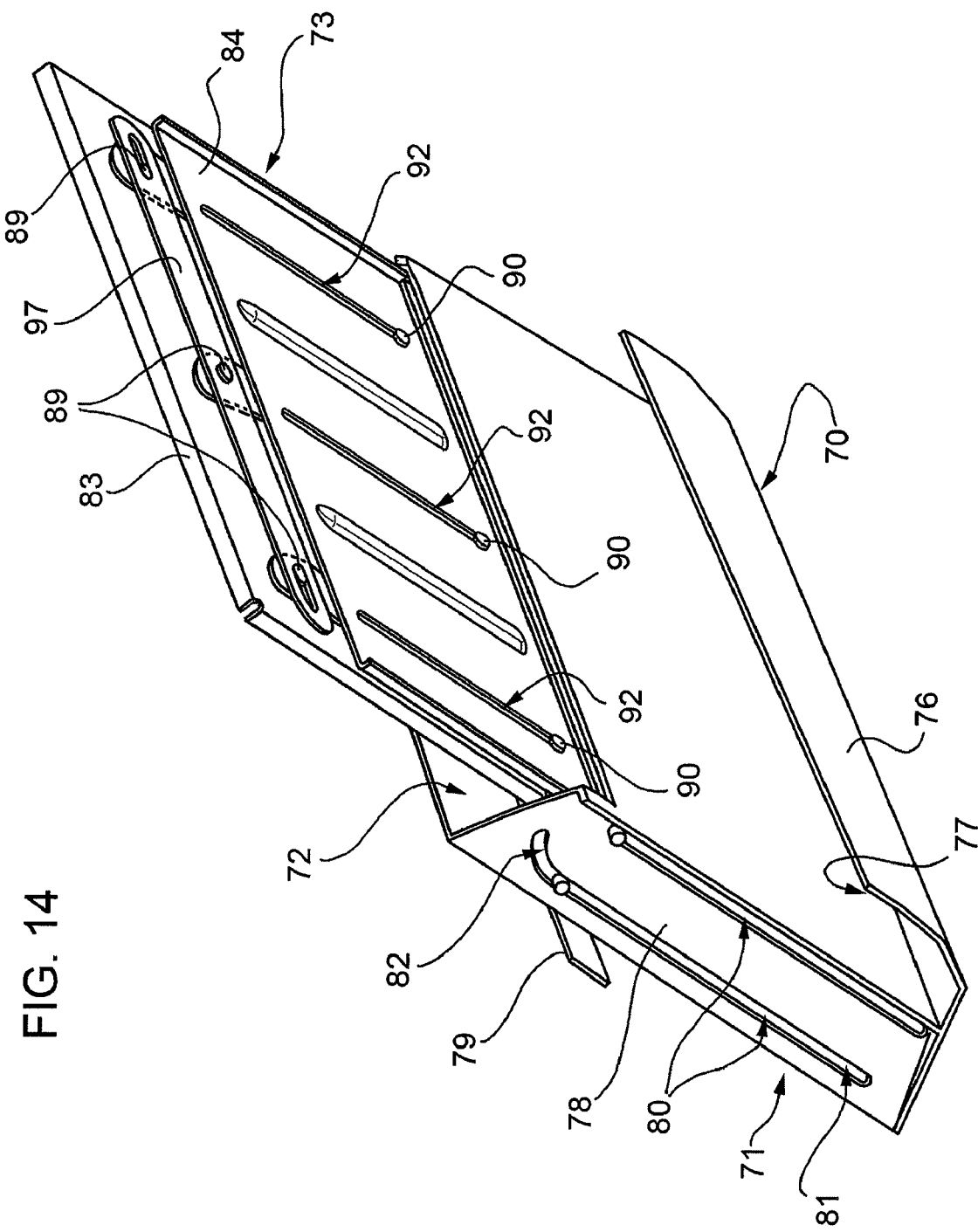
FIG. 14 shows only the interchangeable module illustrated in FIG. 11, during the first stage of extraction.
Figure 15:
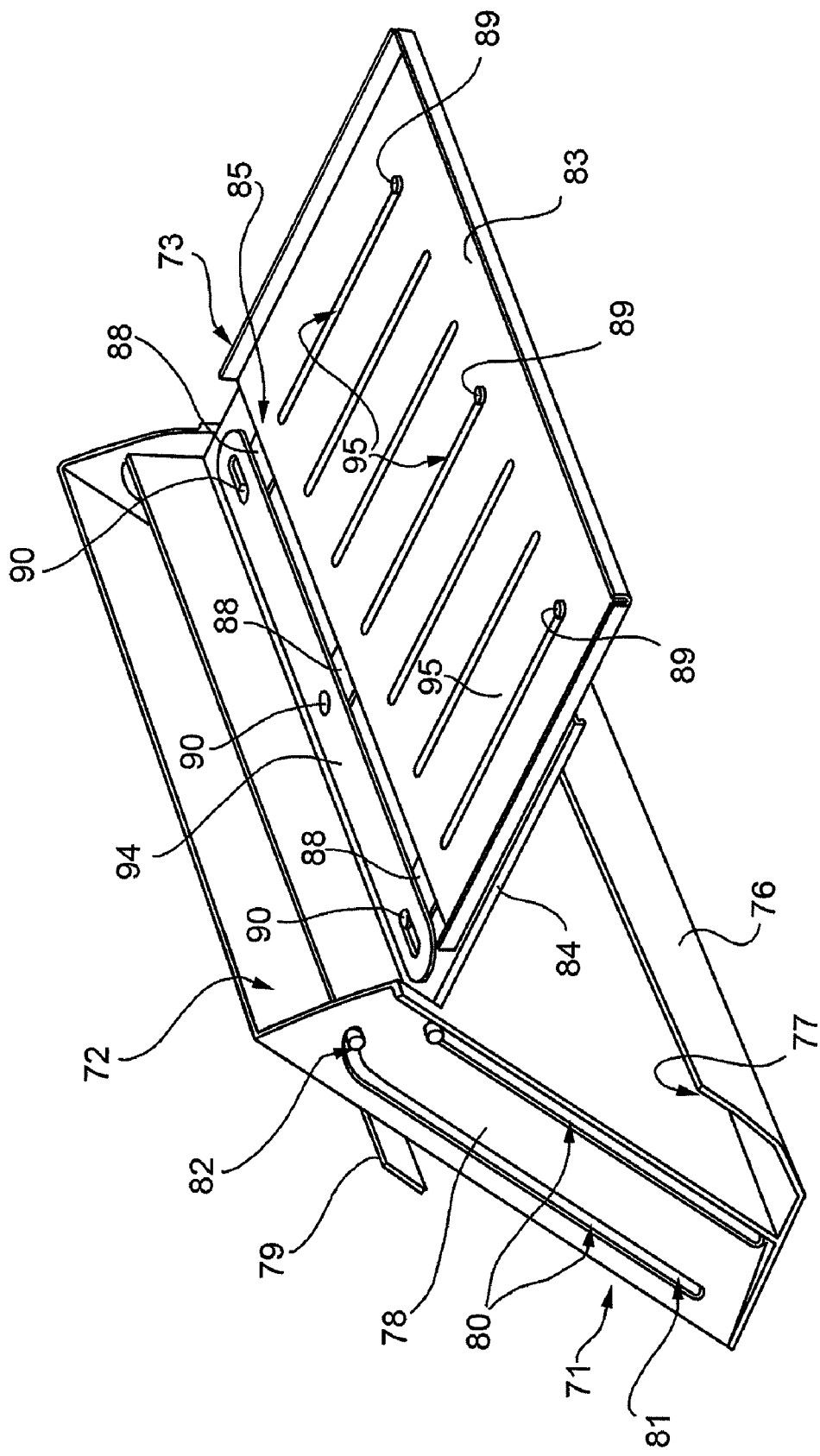
FIGS. 15 to 18 are similar to FIG. 14 and show the successive stages of extraction.
Figure 16:
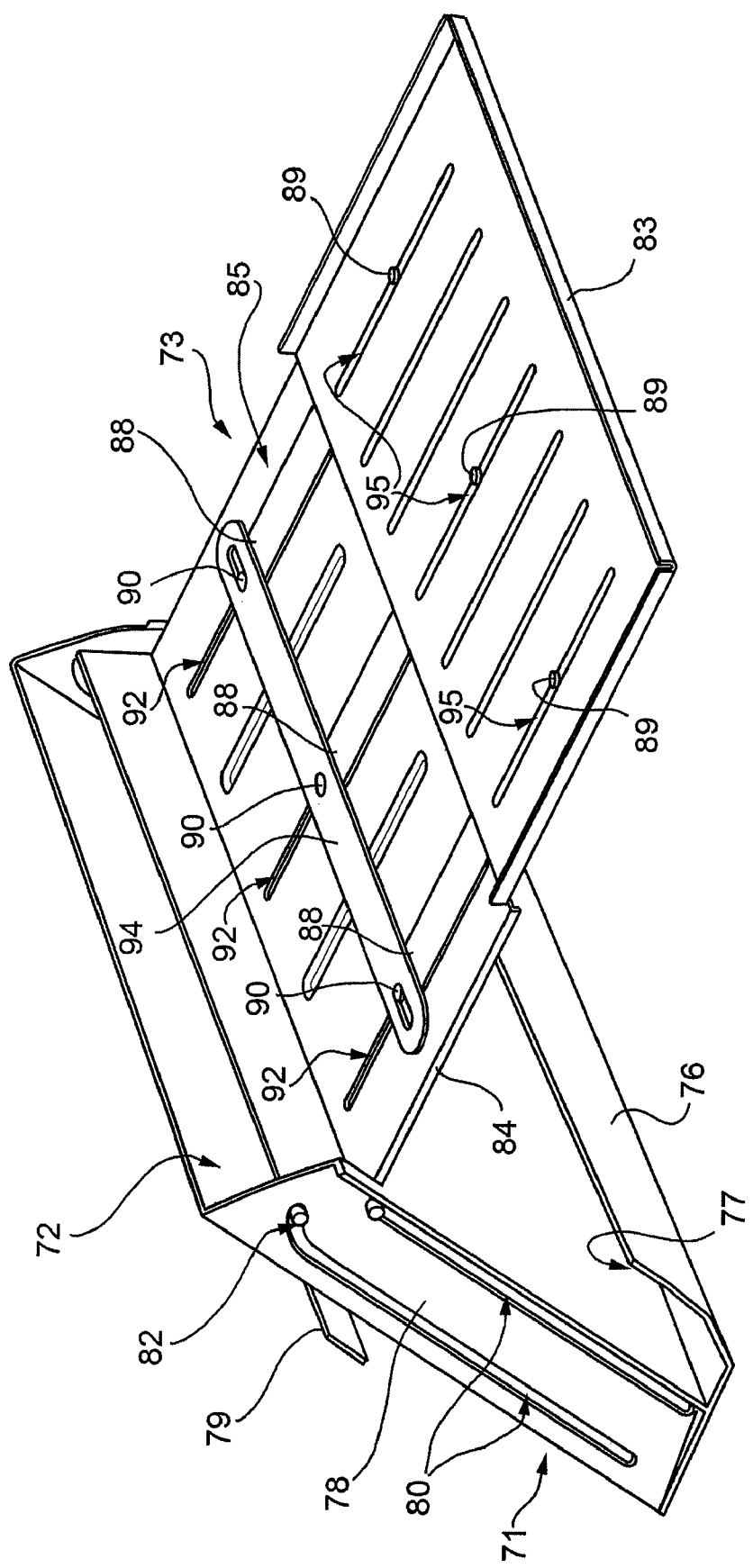
Figure 17:
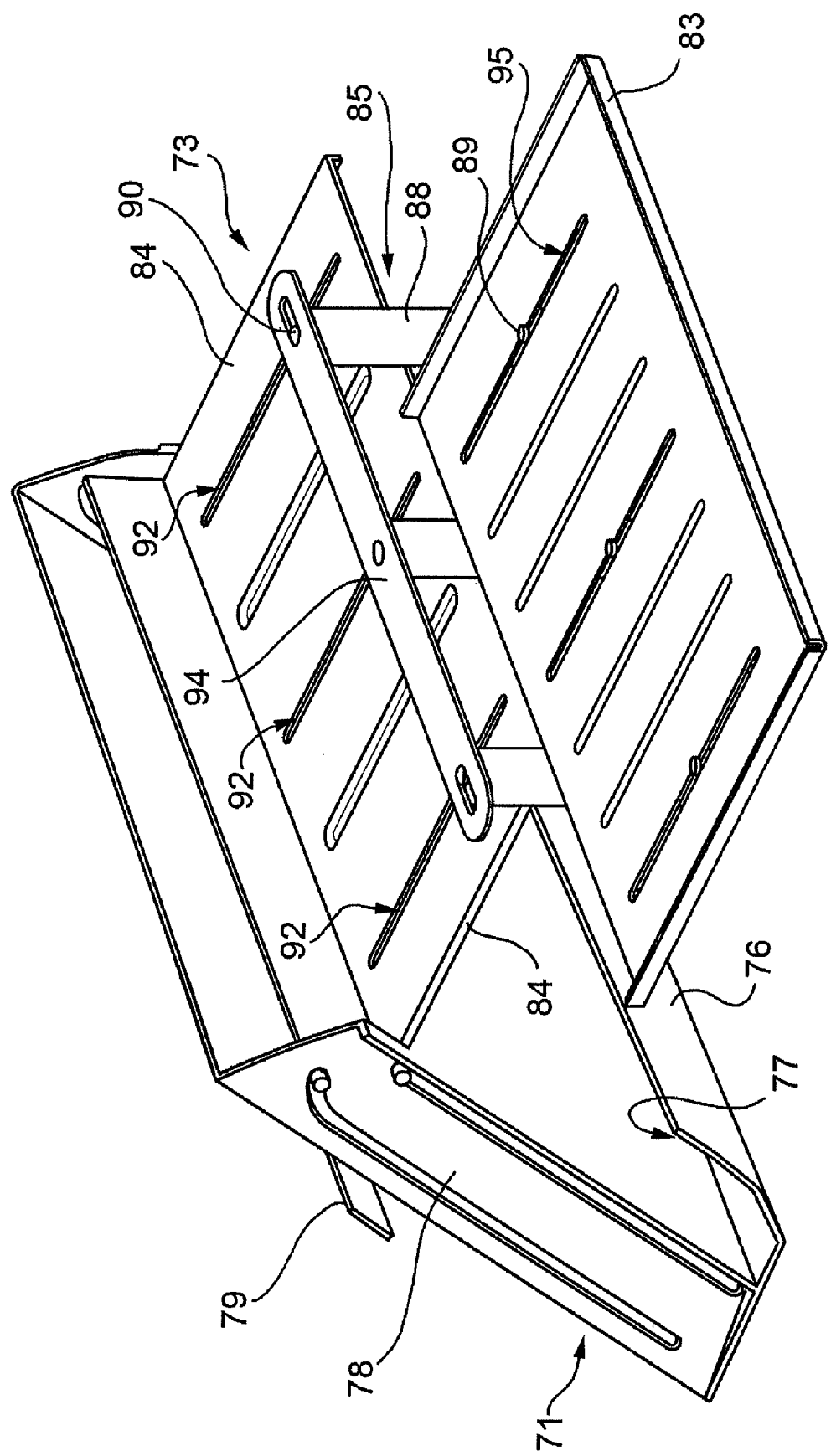
Figure 18:
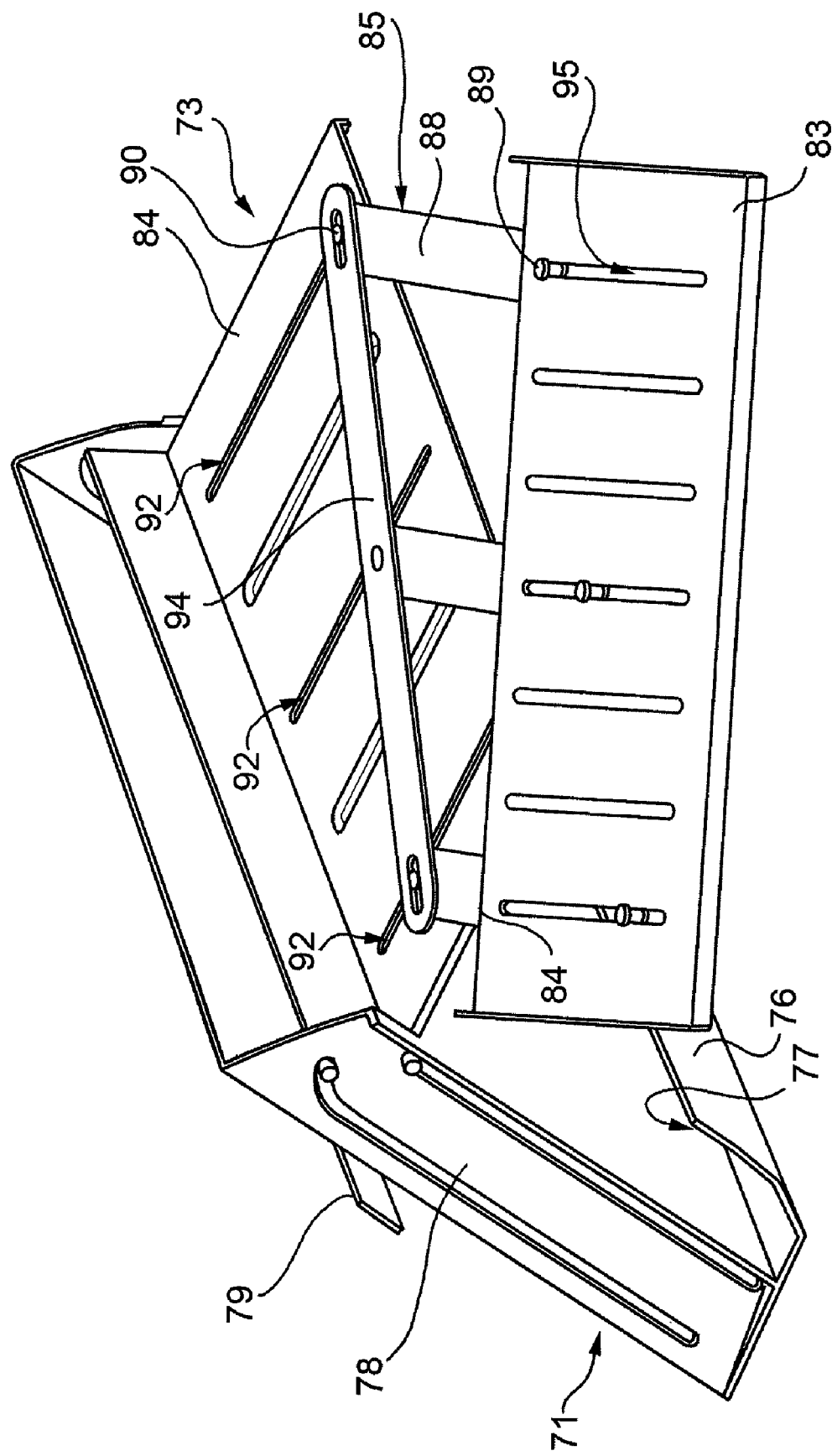

FIGS. 11 to 18 illustrate a module 70, whose constituent parts are shown, where possible, by the same reference numerals as modules 20 and 60. The module 70 comprises a frame 71 defining a compartment 72 inclined upwards; and a support 73, which can be extracted from the compartment 72 through the opening 39 and is configured to support a laptop computer 75. The frame 71 comprises a fin 76, which extends projecting upwards and in a position facing the door 43, it delimits the opening 27 with its upper edge, and defines a recess 77. The recess 77 is capable of housing objects such as notebooks, papers and pens and can be accessed by opening the door 43. The compartment 72 is delimited laterally by two walls 78, which form part of the frame 71 and are hinged to the door 43, in a way not shown, by means of the pins 31, and have projecting respective opposing attachment tabs 79 that snap lock onto the teeth 34 (FIG. 12).

The walls 78 have respective pairs of guides 80 configured so as to cause the support 73 to slide outwards along an upwardly inclined straight section 81 and so as to rotate the support 73 towards a horizontal position along an extraction end section 82.

The support 73 comprises a rectangular tray 83, on which to rest the laptop computer 75; a parallel rectangular plate 84 beneath the tray 83, and connected in a sliding manner to the guides 80; and a linkage 85 which connects the tray 83 to the plate 84 and comprises three connecting-pieces 88 all of the same length. The connecting-pieces 88 are connected in a rotating manner, at one of their ends 89, to the tray 83 and, at the opposite end 90, to the plate 84, so as substantially to define an articulated quadrilateral. In particular, the ends 90 engage in a sliding manner in respective straight guides 92 made in the plate 84 parallel to the short sides of the plate 84 and are joined together by a connecting-piece 94, which is arranged along the upper face of the plate 84 and keeps the ends 90 in positions that are aligned with each other while sliding/rotating in the guides 92. Similarly, the ends 89 engage in a sliding manner in respective straight guides 95 made in the tray 83 parallel to a short side of the tray 83 and are joined together by means of a connecting-piece 97 (FIGS. 13 and 14), which is arranged along the lower face of the tray 83 and keeps the ends 89 in positions that are aligned with each other while sliding/rotating in the guides 95.

In this way, after having extracted the support 73 from the compartment 72 (FIGS. 13 and 14) and having brought the support 73 to a horizontal position (FIG. 15), it is possible to extract the tray 83 in relation to the plate 84 in a longitudinal direction, that is parallel to the guides 92, keeping the guides 92 and 95 parallel to each other. In this position (FIG. 16), the laptop computer can be used by a passenger sitting on the front right-hand seat of the motor vehicle in front of the drawer 1.

From this position, it is possible to slide the tray 83 sideways in relation to the plate 84 by rotating the connecting-pieces 88 in relation to the plate 84 about vertical axes defined by the ends 90 (in a clockwise direction in the Figure) and in relation to the tray 83 about respective vertical axes defined by the ends 89, but leaving the connecting-pieces 94 and 97 at right angles to the guides 92 and 95. In this new position (FIG. 17), the laptop computer can be used by a passenger sitting on a front middle seat of the motor vehicle.

Lastly, it is possible to rotate the tray 83 in relation to the plate 84 (in a clockwise direction in the Figure), therefore rotating the connecting-pieces 94 and/or 97 in relation to the guides 92,95. In this position (FIG. 18), the laptop computer can be used by the driver sitting on the front left-hand seat of the motor vehicle.

During the fitting stage, the module 70 is connected to the shell 3 in a similar manner to module 20: the door 40 is connected to the walls 8 subsequently to close the opening 39 located above the door 43.

From the above it is clear that modules 20, 60 and 70, being mutually interchangeable, can be chosen as alternatives to each other, which means that they succeed in meeting the different requirements of users in an extremely simple manner and, therefore, result in versatile use of the drawer 1 by a user or in flexible outfitting of the motor vehicle during manufacture.

The fact that the pins 31 are used both to hinge the door 43 and to connect the module 20, 60, 70 to the shell 3 simplifies the constructional characteristics and fitting.

Modules 20 and 60 are ideal for making the journey pleasant, while module 70 succeeds in transporting a laptop computer in a compact and efficient manner. Lastly, from the above it is clear that modifications and variants can be made to the drawer 1 described without departing from the scope of protection of the present invention.

For example, the top door 40 could form part of the interchangeable module and be hinged to the walls 26. As mentioned above, the pins 31 could be carried by the walls 26 and 78, instead of by the door 43. Furthermore, the shell 3 need not have any bracket 10 if it were rigid enough to support the module 20, 60, 70 and the objects contained in the module on its own.

The invention claimed is:

1. A module for forming a glove box in a dashboard of a motor vehicle; said module being housed, in use, in a shell fixed to said dashboard; said module comprising:
    a container defining an inner space and an access opening allowing access to said inner space;
    attachment means provided to connect said container in a fixed position to said shell;
    a door movable relative to said container to open and close said access opening; and
    two hinge elements coaxial with each other along a horizontal axis and hinging said door to said container about said horizontal axis;
    said attachment means further provided to disconnect said container from said shell so that said module being interchangeable with another module from a plurality of different modules having the same attachment means;
    said hinge elements adapted to slid into slots in side walls of said shell.

2. The module according to claim 1, wherein said hinge elements form part of said attachment means.

3. The module according to claim 1, wherein said hinge elements are defined by pins that project axially outwards in relation to respective side walls of said container so as to connect said container to said shell.

4. The module according to claim 3, wherein said pins are fixed in relation to said door and pass through respective hinge seats in the side walls.

5. The module according to claim 1, wherein said container and/or said door are thermally insulated and define a cooled compartment.

6. The module according to claim 5, wherein said container carries, on the outside of said cooled compartment, a refrigeration system.

7. The module according to claim 1, further comprising a support extractable from said container and configured to carry a laptop computer.

8. The module according to claim 7, wherein said container comprises a fin pushing upwards, delimiting said access opening with its upper edge, and defining an object-holding recess accessible through said access opening; said support is extractable from said container through an opening located above said access opening.

9. The module according to claim 7, wherein said container comprises guide means configured so as to make said support slide upwards in a straight direction and so as to rotate said support towards a horizontal position along an extraction end section.

10. The module according to claim 9, wherein said support comprises:
    a tray, on which to rest said laptop computer;
    a structure connected in a sliding manner to said guide means; and
    linkage means that connect said tray to said structure.

11. The module according to claim 10, wherein said linkage means comprise at least two connecting pieces side-by-side and spaced apart and hinged at one end to said tray and at the opposite end to said structure; the ends of said connecting pieces sliding along the respective guides made in said tray and in said structure.

12. The module according to claim 1, wherein said container supports an electric machine for preparation of coffee.

13. The module according to claim 12, wherein said door carries a plurality of object-holding compartments which lie alongside said electrical machine for preparation of coffee.

14. A glove box of a dashboard of a motor vehicle, said glove box comprising:
    a shell fixed to said dashboard;
    an interchangeable module housed, in use, in said shell, said module comprising:
        a container defining an inner space and an access opening allowing access to said inner space;
        attachment means provided to connect said container in a fixed position to said shell;
        a door movable to open and close said access opening; and
        two hinge elements coaxial with each other along a horizontal axis and hinging said door to said container about said horizontal axis;
        said attachment means further provided to disconnect said container from said shell so that said module being interchangeable with another module from a plurality of different modules having the same attachment means;
    said interchangeable module fixed to said shell by said attachment means, said shell defining an additional compartment above said container and an additional opening positioned above said access opening; and
    a panel to close said additional opening.

15. The glove box according to claim 14, wherein said shell comprises two side walls having respective slots, which are parallel to each other, have respective openings and end with respective blind portions engaged by said hinge elements.

16. The glove box according to claim 14, wherein said shell is made of a plastic material; and wherein said shell comprises two metal stiffening portions, arranged around said shell and engaged by said hinge elements.

17. The glove box according to claim 14, further comprising snap-lock means to connect together said module and said shell.

18. The glove box according to claim 14, wherein said panel is movable; and wherein said additional opening is an access for said additional compartment defined from below by said container and from above by said shell.

19. The glove box according to claim 14, wherein said panel is movable; and wherein said additional opening is an outlet for an extractable support of a laptop computer.

* * * * *